United States Patent
Barklage et al.

(10) Patent No.: US 8,099,981 B2
(45) Date of Patent: Jan. 24, 2012

(54) APPARATUS FOR PREHEATING BATCHES OF GLASS CULLET

(75) Inventors: Hansjurgen Barklage, Nienburg (DE); Wolfgang Cieleback, Nienburg (DE); Rolf Schaper, Wahlstedt (DE)

(73) Assignee: Ardagh Glass GmbH, Nienburg (DE)

( * ) Notice: Subject to any disclaimer, the term of this patent is extended or adjusted under 35 U.S.C. 154(b) by 0 days.

(21) Appl. No.: 12/772,392

(22) Filed: May 3, 2010

(65) Prior Publication Data

US 2010/0275656 A1  Nov. 4, 2010

(30) Foreign Application Priority Data

May 4, 2009  (DE) .......................... 10 2009 019 454

(51) Int. Cl.
C03B 5/26 (2006.01)

(52) U.S. Cl. .................. 65/136.1; 222/413; 65/335

(58) Field of Classification Search .................. 65/324, 65/347, 325, 326; 221/174; 222/412, 413; 198/523, 540, 657
See application file for complete search history.

(56) References Cited

U.S. PATENT DOCUMENTS

| 3,259,325 | A | * | 7/1966 | Hamilton ...................... 414/165 |
| 4,808,043 | A | * | 2/1989 | Le Marrec et al. ........... 406/181 |
| 5,954,851 | A | * | 9/1999 | Sakae ......................... 65/134.6 |
| 2004/0244932 | A1 | | 12/2004 | Forslund et al. | |

FOREIGN PATENT DOCUMENTS

| DE | 3416317 | | 11/1985 |
| FR | 2252970 | | 6/1975 |
| FR | 2641262 | | 7/1990 |
| FR | 2641262 A1 | * | 7/1990 |
| GB | 1282959 | | 7/1972 |
| GB | 2083018 | | 3/1982 |
| JP | 08208239 | | 8/1996 |
| JP | 09143918 | * | 6/1997 |

OTHER PUBLICATIONS

FR 2641262 (Machine Translation) [online], [retrieved on Apr. 27, 2011], retrieved from EPO Database (http://worldwide.espacenet.com/publicationDetails/inpadoc?CC=FR&NR=2641262A1&KC=A1&FT=D&date=19900706&DB=EPODOC&locale=en_EP).*

Leimkuehler J: "Raw Material Preheating and Integrated Waste Heat Utilisation in the Glass Industry" Bd. 125, Nr. 5. ISSN: 0341-0676.

* cited by examiner

*Primary Examiner* — Matthew Daniels
*Assistant Examiner* — Yana Belyaev
(74) *Attorney, Agent, or Firm* — Laurence P. Colton; Smith Risley Tempel Santos LLC

(57) ABSTRACT

An apparatus for preheating a batch (12) of glass cullet which is preferably enriched with raw materials for glass production, comprising a bunker (14) preferably having flow ducts for the passage of warm (off)gas. To discharge the preheated batch of glass cullet from the bunker, the apparatus has one or more discharge worms (26), by way of which the batch of glass cullet can be conveyed to at least one outflow opening (28) in the base region of the bunker (14).

6 Claims, 1 Drawing Sheet

APPARATUS FOR PREHEATING BATCHES OF GLASS CULLET

STATEMENT OF RELATED APPLICATIONS

This application is based on and claims the benefit of German Patent Application No. 10 2009 019 454.1 having a filing date of 4 May 2009, which is incorporated herein in its entirety by this reference

BACKGROUND OF THE INVENTION

1. Technical Field

The present invention relates to an apparatus for preheating a batch of glass cullet which is preferably enriched with raw materials for glass production, comprising a bunker preferably having flow ducts for the passage of warm (off)gas.

2. Prior Art

An apparatus of this type is known, for example, from German Patent No. DE 34 16 317 C2. During the glass production process, this apparatus serves to utilize the thermal energy of the offgases produced during the combustion of the raw materials in the melting furnace for preheating the batch of glass cullet. For this purpose, the offgases are generally guided along flow ducts through the bunker, specifically through the batch of glass cullet—if appropriate in that they have preheated the combustion air required for the melting operation beforehand after they have passed through a heat exchanger. Within the bunker, at least some of the thermal energy of the offgas is transferred to the batch of glass cullet. The preheating of the batch of glass cullet ultimately reduces the amount of thermal energy needed for the downstream melting operation in the melting furnace.

After the batch of glass cullet has flowed through the bunker, it is discharged from the preheater apparatus and fed to the actual melting furnace. However, the discharge of the preheated batch of glass cullet from the preheater is problematic.

This is the case particularly when the batch of glass cullet is to be fed to a melting furnace having a so-called horseshoe fired furnace. This is because the doghouse of the horseshoe fired furnace—the batch feeder alcove of the melting end for feeding the batch of glass cullet—has comparatively small dimensions for design reasons. Therefore, as a rule only one individual chute of a batch feeder can open out into the doghouse of the horseshoe fired furnace, and this chute conveys the batch of glass cullet originating from the preheater apparatus into the doghouse.

In order to produce a continuous flow of material using only one chute, the material discharge capacity of the preheater has to be correspondingly high and constant. It is known in the prior art to use so-called vibrating bases for this purpose in the base region of the preheater. These perform oscillating motions and ensure that the material is discharged as uniformly as possible from the preheater apparatus or that the material discharge capacity of said apparatus is as high as possible. Here, the hoppers open out into the chute of the batch feeder, which in turn opens out into the doghouse.

A disadvantage of this prior art solution is that caking of the warm batch of glass cullet frequently occurs despite the oscillating motions of the vibrating bases. The hoppers accordingly become blocked. As a last consequence, the material discharge is stopped erroneously.

BRIEF SUMMARY OF THE INVENTION

Proceeding from this, it is an object of the present invention to improve the preheater apparatus mentioned in the introduction to such an extent that the batch of glass cullet, after it has passed or flowed through said apparatus, can be discharged as far as possible without any faults with high material discharge capacities. In particular, the aim is to prevent caking of the warm batch of glass cullet to the best possible extent.

This object is achieved by an apparatus of the type mentioned in the introduction for preheating a batch of glass cullet which is preferably enriched with raw materials for glass production, comprising a bunker preferably having flow ducts for the passage of warm (off)gas, characterized in that, in order to discharge the preheated batch of glass cullet from the bunker, the apparatus has one or more discharge worms, by way of which the batch of glass cullet can be conveyed to at least one outflow opening in the base region of the bunker.

Accordingly, in order to discharge the preheated batch of glass cullet from the bunker, the apparatus has one or more discharge worms, by way of which the batch of glass cullet can be conveyed to at least one outflow opening in the base region of the bunker.

It has been found that the solution according to the invention solves the problems which have arisen to date, that of ensuring sufficient material discharge from the preheater, in an optimum manner. In particular, the discharge worms make it possible to prevent caking of the batch of glass cullet.

According to the invention, it is preferred for there to be a plurality of discharge worms which are each arranged above or on the base wall of the bunker. The discharge worms extend, in particular, parallel to one another and convey the batch of glass cullet to the at least one outflow opening. Expediently, all of the discharge worms act in the same direction. In this case, the discharge worms preferably cover substantially the entire base wall of the bunker, and therefore substantially the entire batch of glass cullet flowing from above in the direction of the base wall is conveyed to the at least one outflow opening.

The at least one outflow opening is generally arranged directly inside the base wall of the bunker or is embedded therein. It is preferably arranged in the region of the ends of the parallel discharge worms.

In a further embodiment of the invention, the outflow opening has an elongate design. In this case, it extends along a plurality of or all of the discharge worms transversely with respect to the direction in which they act, to be precise underneath them, in particular along their ends.

The discharge worms are advantageously arranged above or on the generally substantially rectangular base wall in such a way that the direction in which they act extends transversely to the longitudinal extent of the base wall. In this case, the at least one, advantageously strip-shaped outflow opening extends in the longitudinal direction of the base wall. In this case, the discharge worms convey the batch of glass cullet in the direction of this longitudinal opening.

The batch of glass cullet could then be fed from the at least one outflow opening directly to a batch feeder for feeding the batch into a doghouse of a melting end.

However, a further preferred embodiment of the invention provides for at least one conveyor worm to be arranged underneath the at least one outflow opening arranged in the base wall, and this worm acts at an angle, in particular perpendicularly or transversely, to the discharge worms arranged above the base wall of the bunker. In other words, the material flowing downwards from the outflow opening is conveyed on by the conveyor worm or worms in a direction at an angle or transversely to the direction in which the discharge worms act.

The at least one conveyor worm is preferably arranged directly underneath the outflow opening. Therefore, the material flows directly through the—in particular strip-shaped—outflow opening downwards, where it hits the at least one conveyor worm acting at an angle.

In a further embodiment of the invention, said conveyor worm finally conveys the batch, which generally flows in a wide material flow, to one or more obliquely or perpendicularly downwardly extending conveyor ducts which are arranged, in particular, in the region of the end of said conveyor worm. These conveyor ducts subsequently open out preferably into the region of the above-mentioned batch feeder, which conveys the batch of glass cullet to the doghouse of the burner tank.

The at least one conveyor duct preferably ends above an upper hopper opening of a hopper of the batch feeder or else within the upper hopper opening.

BRIEF DESCRIPTION OF THE DRAWING

Further features of the present invention are apparent from the accompanying patent claims, from the following description of a preferred exemplary embodiment and from the accompanying drawing, in which:

DETAILED DESCRIPTION OF PREFERRED EMBODIMENTS

Figure 1:
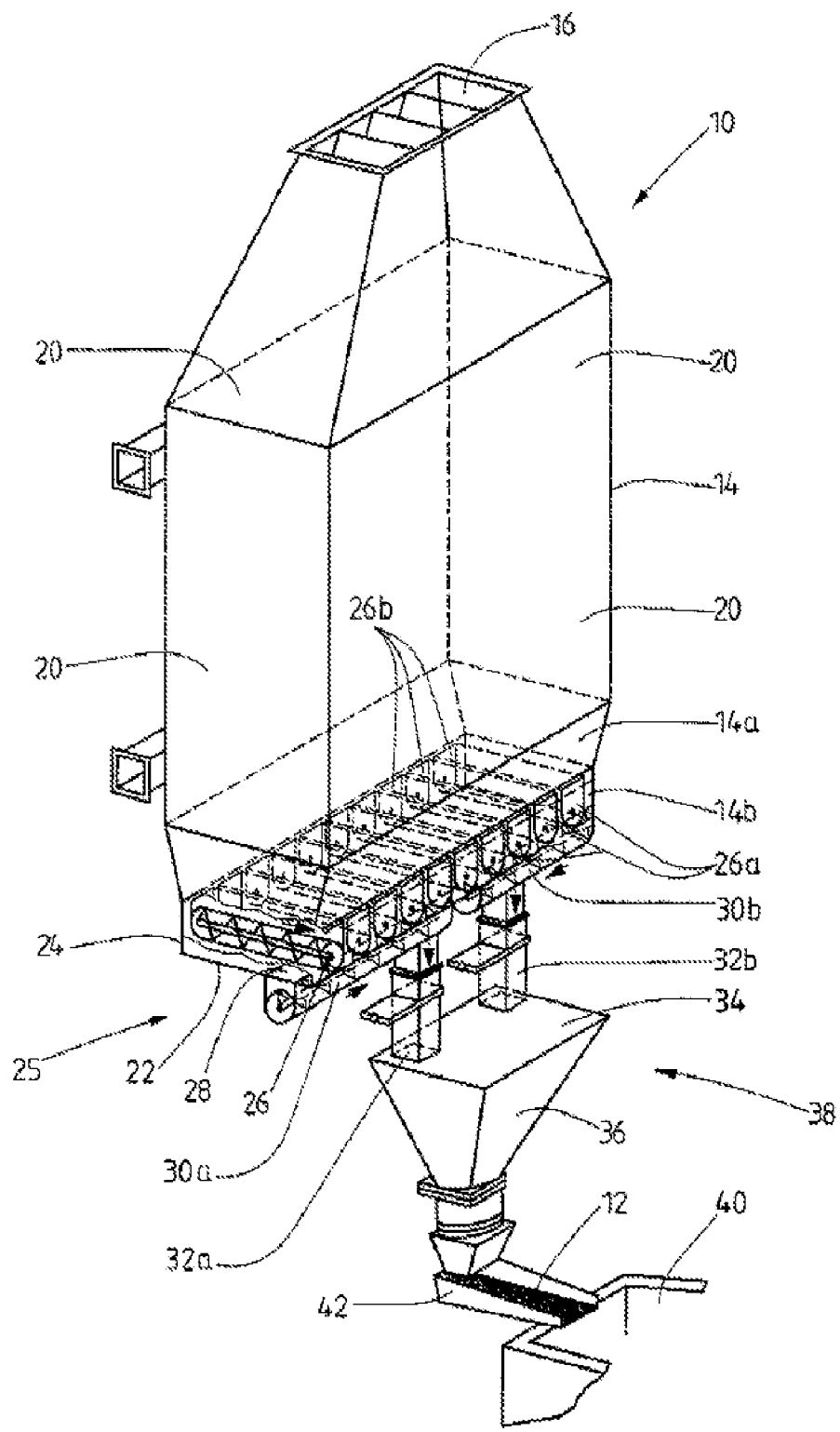
FIG. 1 shows an oblique view, partially cut away, of an apparatus according to the invention for preheating batches of glass cullet.

FIG. 1 shows an apparatus 10 according to the invention for preheating a batch 12 of glass cullet, comprising a bunker 14. The batch 12 of glass cullet to be preheated is fed to the bunker 14 through an upper opening 16, in a manner which is not shown. The measures required for the feeding operation are known in the prior art.

The batch 12 of glass cullet generally flows approximately continuously from top to bottom in the bunker 14, at least when the batch 12 of glass cullet is fed in continuously. In this case, the batch 12 of glass cullet is heated as it passes through the bunker 14. Hot offgases which have been produced during a melting operation in a glass melting furnace (not shown) are fed to the bunker 14 in order to preheat the batch 12 of glass cullet therein.

A large number of horizontally extending flow ducts (not shown for the sake of simplicity) are located within the main part of the bunker 14, which, in the present case, is rectangular and formed by upright side walls 20. The flow ducts, which are arranged one above another, are connected to one another and positioned within the bunker 14 in such a way that the warm offgas can be fed in in the lower region of the bunker 14 and can be guided upwards within the bunker 14 in crosswise countercurrent. The batch 12 of glass cullet is thereby heated by the warm or hot offgas flowing past in the manner of a heat exchanger. Further details relating to the way in which such a preheating apparatus works can be gathered, for example, from German Patent No. DE 34 16 317 C2, the content of which is hereby integrated in the present application.

After the batch 12 of glass cullet has passed through the bunker 14, the preheated batch of glass cullet has to be removed from said bunker.

For this purpose, the bunker 14 narrows towards the bottom and has, in the lower region, a funnel-shaped region 14a. The funnel-shaped region 14a of the bunker 14 is adjoined by a bunker base pan 14b with a rectangular cross section, upright side walls 24 and a base wall 22 which closes off the bunker 14 and the base pan 14b at the bottom.

In the present example, ten discharge worms 26 are arranged in the base pan 14b transversely to the longitudinal extent of said pan. These discharge worms cover substantially the entire, rectangular base wall 22 and, at each of their ends 26a, 26b, each adjoin the upright side walls 24 of the base pan 14b. The ten discharge worms 26 are arranged in parallel, and therefore the directions in which they act likewise extend in a parallel manner. The directions in which the discharge worms 26 act in the base pan 14b, these directions extending transversely to the base wall 22, are shown by way of example by a corresponding arrow in FIG. 1.

As a rule, the preheated batch 12 of glass cullet flows continuously from above onto the discharge worms 26 and is conveyed, in the direction in which the respective discharge worms 26 act, in the direction of the longitudinal side wall, at the front in FIG. 1, of the base pan 14b. A strip-like outflow opening 28 or outflow recess 28, which extends transversely to the directions in which the worms 26 act and also in the longitudinal direction in relation to the base wall 22, is arranged in the base wall 22, in the region of the ends 26a of the discharge worms 26 which adjoin the front longitudinal side wall.

The batch 12 of glass cullet conveyed by the worms 26 in each case in the direction of said longitudinally extending outflow opening 28 flows through said outflow opening downwards out of the base pan 14b.

Two mutually aligned, further conveyor worms 30a and 30b are arranged directly underneath the strip-shaped outflow opening 28 parallel to the longitudinal extent of the latter, and therefore transversely to the directions in which the discharge worms 26 act. These conveyor worms each convey the batch 12 of glass cullet in the opposite direction, to be precise towards upper inlet openings of vertically downwardly extending conveyor ducts 32a, 32b. These upper inlet openings of the conveyor ducts 32a, 32b are arranged in the region of the ends of the worms 30a, 30b, directly underneath the latter.

The conveyor ducts 32a, 32b have a square cross section and each open out into the upper opening 34 of a hopper 36 of a so-called batch feeder 38.

The batch feeder 38 subsequently ensures that the batch 12 of glass cullet is conveyed to the doghouse 40 of a horseshoe fired furnace of the glass melting furnace (not shown). For this purpose, after it has flowed through the hopper 36 the batch of glass cullet flows to a vibrating chute 42 of the batch feeder 38, and this chute in turn opens out directly into the doghouse 40.

LIST OF REFERENCE SYMBOLS

10 Preheating apparatus
12 Batch of glass cullet
14 Bunker
14a Funnel-shaped portion
14b Base pan
16 Upper opening
20 Side wall
22 Base wall
24 Side wall
26 Discharge worm
26a End
26b End
28 Longitudinal recess
30a Conveyor worm
30b Conveyor worm 32a Conveyor duct
32b Conveyor duct
34 Opening
36 Hopper
38 Batch feeder
40 Doghouse

What is claimed is:

1. An apparatus for preheating a batch (12) of glass cullet which is preferably enriched with raw materials for glass production, comprising:
   a bunker (14) having flow ducts for the passage of warm offgas through the bunker (14), a base pan (14b) having a bottom, a base wall (22) which forms the bottom of the base pan (14b), and at least one outflow opening (28) located in the base wall (22);
   a plurality of discharge worms (26) arranged above the base wall (22); and
   at least one conveyor worm (30a, 30b) arranged underneath the at least one outflow opening (28),
   wherein:
   the plurality of discharge worms (26) discharge the preheated batch of glass cullet from the bunker (14), by conveying the batch of glass cullet to the at least one outflow opening (28), and
   the at least one conveyor worm (30a, 30b) acts at a perpendicular angle to the plurality of discharge worms (26).

2. The apparatus according to claim 1, wherein the plurality of discharge worms (26) cover substantially the entire base wall (22) of the bunker (14), and substantially the entire batch (12) of glass cullet located in the base region is conveyed to the at least one outflow opening (28).

3. The apparatus according to claim 1, further comprising a conveyor duct (32a, 32b) extending obliquely or perpendicularly downwardly underneath and at an end of the at least one conveyor worm (30a, 30b), wherein the at least one conveyor worm (30a, 30b) conveys the batch (12) of glass cullet to the conveyor duct (32a, 32b).

4. The apparatus according to claim 3, wherein the conveyor duct (32a, 32b) opens out into a batch feeder (38) for conveying the batch (12) of glass cullet to a doghouse (40) of a burner tank of a horseshoe fired furnace.

5. The apparatus according to claim 4, wherein the conveyor duct (32a, 32b) opens out above or within an upper hopper opening (34) of a hopper (36) of the batch feeder (38).

6. The apparatus according to claim 3, wherein the conveyor duct (32a, 32b) opens out above or within an upper hopper opening (34) of a hopper (36) of a batch feeder (38) for conveying the batch (12) of glass cullet to a doghouse (40) of a burner tank of a horseshoe fired furnace.

* * * * *